UNITED STATES PATENT OFFICE.

WILBUR S. ALLAN, OF FREEPORT, AND HENRY HERBERT STURGIS AND JAMES WENDELL STURGIS, OF STANDISH, MAINE.

FERTILIZER AND METHOD OF PREPARING SAME.

1,178,119. Specification of Letters Patent. Patented Apr. 4, 1916.

No Drawing. Application filed November 13, 1914. Serial No. 872,005.

*To all whom it may concern:*

Be it known that we, WILBUR S. ALLAN, a citizen of the United States, residing at Freeport, Cumberland county, and State of Maine, and HENRY HERBERT STURGIS and JAMES WENDELL STURGIS, citizens of the United States, residing at Standish, Cumberland county, and State of Maine, have invented and discovered certain new and useful Improvements in Fertilizers and Methods of Preparing Same, of which the following is a specification.

Our said invention relates to fertilizers and consists in a method of treating the substance commonly called "muscle mud", which is of shell-fish formation and contains compounds of nitrogen, or phosphorus, or calcium, or of any or all of these elements, so that it may be converted into a product adapted for use as a fertilizer, in commercial form.

The substance referred to is found along certain sections of the sea coast in substantial deposits or beds, from which it is secured in crude or raw state by excavating the muscle mud, draining the water therefrom, and then drying the substance in ovens, or drying cylinders subjected to heat from fire, steam or electricity so as to evaporate the remaining moisture therefrom. We then grind the dried material to such fineness as will make it most readily soluble in water and thus most readily available as a plant food or fertilizer. In this form it is or may be combined or mixed with other substances containing plant nourishing elements, such as finely ground potash bearing rock, or any other substance which may be deemed necessary for the particular purpose for which it is to be used. By such treatment the substance is converted into a form in which it may be easily shipped and readily handled as an article of commerce. It also reduces it to a form in which it may be readily incorporated in a fertilizer of varying characteristics by the mixture therewith of other substances of such properties as may be most advantageous to the soil where it is to be used, or to the character of plant life which it is intended to fertilize or nourish.

Having thus fully described our said invention what we claim as new and desire to secure by Letters Patent is:

1. A fertilizer having as its basis "muscle mud" dried and reduced to granular form, substantially as set forth.

2. A fertilizer consisting of dried and pulverized "muscle mud" mixed with other plant nourishing substance, substantially as set forth.

3. The method of preparing fertilizer which consists in taking "muscle mud" in desired quantities, drying the same, then reducing to a granular form, and combining with other plant nourishing substance, substantially as set forth.

4. The method of preparing fertilizer which consists in taking "muscle mud" in desired quantities, drying the same, then pulverizing, and then mixing with other fertilizing substances, substantially as set forth.

In witness whereof, we have hereunto set our hands and seals at Portland, Maine, this 9th day of November, A. D., nineteen hundred and fourteen.

WILBUR S. ALLAN. [L. S.]
H. HERBERT STURGIS. [L. S.]
J. WENDELL STURGIS. [L. S.]

Witnesses:
MARGIE L. TWITCHELL,
E. P. CLEMENTS.

Copies of this patent may be obtained for five cents each, by addressing the "Commissioner of Patents, Washington, D. C."